United States Patent [19]

Georges

[11] Patent Number: 5,056,624

[45] Date of Patent: Oct. 15, 1991

[54] SEE-SAW MOTION LOADING DEVICE FOR A LOADING-PLATFORM

[75] Inventor: Jean Georges, Menil aux Bois, France

[73] Assignee: Jige Lohr Wreckers, S.A., Revigny-sur-Ornain, France

[21] Appl. No.: 462,199

[22] Filed: Jan. 9, 1990

[30] Foreign Application Priority Data

Jan. 10, 1989 [FR] France ............................. 89 00221

[51] Int. Cl.⁵ ............................................. B66F 7/08
[52] U.S. Cl. ................................. 187/8.71; 298/17 B; 254/8 C; 410/63; 410/24
[58] Field of Search ................. 414/462, 495; 410/24, 410/44, 58, 63; 254/8 C, 9 C, 124; 187/8.71, 8.72, 18; 298/17 B

[56] References Cited

U.S. PATENT DOCUMENTS

| | | | |
|---|---|---|---|
| 3,173,644 | 3/1965 | Burfiend | 298/17 B X |
| 3,183,037 | 5/1965 | Reichert | 298/17 B |
| 3,317,004 | 5/1967 | Harrison, Jr. | 187/8.72 X |
| 3,844,421 | 10/1974 | Nielson | 187/8.71 X |

FOREIGN PATENT DOCUMENTS 1164042  5/1958  France .................................. 410/58

Primary Examiner—Robert J. Spar
Assistant Examiner—Donald W. Underwood
Attorney, Agent, or Firm—Schwartz & Weinrieb

[57] ABSTRACT

A see-saw motion loading device for a loading platform makes use of an auxiliary chassis installable on the frame of a vehicle carrier. At least one see-saw motion rocking member cooperates with a fixed base, and preferably also with a base movable towards and away from the fixed base. A device, such as a hydraulic jack or the like is provided for opening and closing of the see-saw motion rocking member.

7 Claims, 1 Drawing Sheet

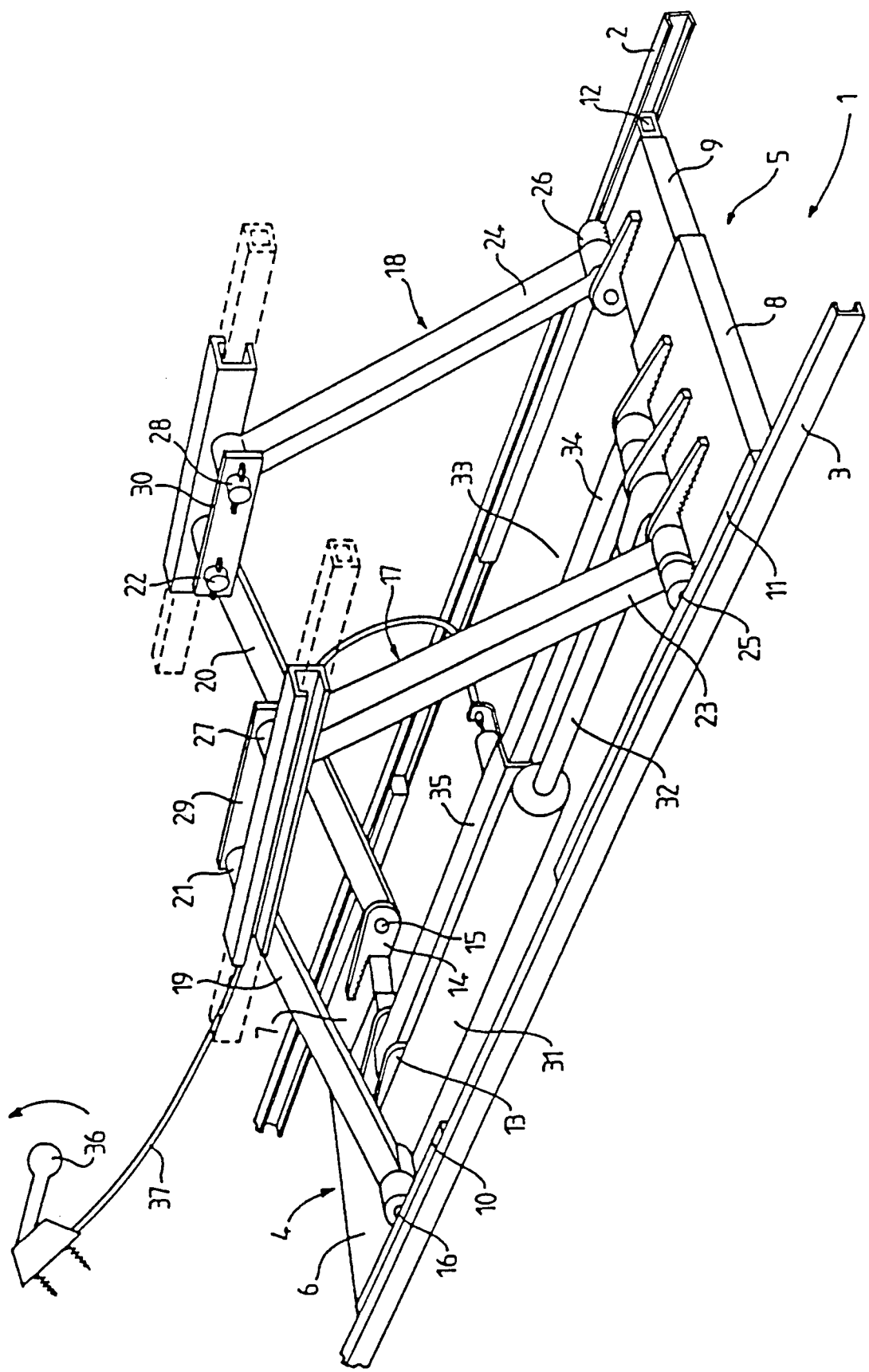

SEE-SAW MOTION LOADING DEVICE FOR A LOADING-PLATFORM

FIELD OF THE INVENTION

The present invention relates to a see-saw motion loading device capable of rocking movement for use primarily in conjunction with a vehicle carrier.

BACKGROUND OF THE INVENTION

Carrier vehicles of this type are particularly suitable for the transport of automobiles which have broken down, or which are to be impounded.

In the present state of the art loading devices are known which are constituted of a loading platform pivotable about a transverse axis disposed at the rear of an auxiliary frame or chassis. This auxiliary chassis is intended to be installed on the frame or chassis of a standard vehicle carrier. The swinging or rocking movement of the loading platform is carried out by means of a hydraulic jack which, on one hand, is supported on a loading platform, or on a carrying frame, and on the other hand on a fixed point of the auxiliary chassis. In order to obtain sufficient leverage at the start of the swinging movement, it is necessary to decouple the support point or support region of the hydraulic jack at a region below the plane of the auxiliary chassis.

In effect, the encroachment of the hydraulic jack into a region below the plane of the auxiliary chassis results in numerous incoveniences or difficulties, that is, such usually embodies interference with important operational parts of the vehicle carrier. In order to free a sufficient space for the functioning of the hydraulic jack, it is frequently necessary to modify the hydraulic brake lines, pneumatic lines, lines serving for fluid leakage flow, or for the supply of gas, which entails not only an additional cost incurred by this modification, but also results in general in a limitation of the warranty usually given by the manufacturer of the vehicle carrier which has been so modified.

In the prior art it has also been proposed to decouple the axis of rotation of the loading platform below the plane of the auxiliary chassis so as to, in effect, obtain a leverage action, even though the hydraulic jack is coplanar with the chassis, and the loading platform is in a lowered position. An implementation of this type is, however, in any case less desirable, as it requires unacceptable structural alterations on the auxiliary chassis, on the loading platform, and/or on the vehicle frame.

OBJECT OF THE INVENTION

It is a primary object of the present invention to create a loading device which avoids the disadvantages of the prior art in view of it taking up very little height. In fact, the entire assembly of the swinging or rocking means can be disposed in the interior of the auxiliary chassis, and of the frame supporting the loading platform without taking up any additional or excessive height.

SUMMARY OF THE INVENTION

The present invention relates in particular to a loading device including an auxiliary chassis for installation on a frame of a vehicle carrier, and defining a direction of loading, and a loading platform pivotable about an axis substantially in a horizontal plane, transverse to the direction of loading, and disposed on a rear portion of said auxiliary chassis as seen in the direction of loading, where the improvement includes an openable and closeable see-saw-motion rocking member device movable between open and closed positions along a vertical plane and having a lower axle which defines a stationary axis on the auxiliary chassis, a first lower branch having a first end pivotable about the lower axle, a first upper axle, a second end of the first branch being pivotably connected to the first upper axle, a sliding block device having one end thereof pivotably connected to the second end of the first branch, and being movable along the direction of loading a second branch having first and second ends, the first end thereof being pivotably connected with the second end of the first branch, a second lower axle pivotably connected to the second end of the second branch, a base movable along the loading direction, the second lower axle being stationary with respect to the movable base and a device for opening and closing the see-saw-motion rocking member device.

The device for opening and closing the see-saw-motion rocking member device can be replaced by any other means known in the art, in particular by an electric motor, by a hydraulic motor, or by a remote firing device placing a command to an endless screw, by a toothed rack or a chain, and also by a hydraulic jack.

Apart from the advantageous feature that the height of the loading device according to the present invention is only very small and causes consequently only very little inconvenience in installing the same, that is, for all intents and purposes there is an absence of any constraints when installing the see-saw-motion loading device, it has other numerous advantages. In particular, the see-saw-motion movement of the loading device functions very smoothly and gently, even from the time of departure of the vehicle carrier. Furthermore, the structure of this manner of creating a see-saw movement presents a visual aspect of great stability. This advantage is not negligible, for the driver of the vehicle carrier is generally not an engineering specialist, as far as the resistance of materials is concerned, and is generally reassured by the aspects of trestles or stays which is provided by the manner of creating a see-saw movement in the loading device.

Furthermore, as a result of utilizing a hydraulic jack for the device for opening and closing the see-saw-motion rocking member or members, an amplification of the angle of see-saw oscillation is obtained, without having to resort to any special jacks having a very great length.

According to an advantageous embodiment, a second upper axle is pivotably connected to another end of the sliding block device, and wherein the first end of the second branch is pivotably connected to the second upper axle.

This implementation leads to a symmetrical implementation of the pivotable rocker, which improves the performance and minimizes any instability of the see-saw movement device.

According to a preferred implementation, there are further provided two elongated members, and at least one stationary base, the bases being movable telescopically with respect to one another along a direction substantially parallel with the loading direction, and being disposed between, transversely to, and in respective contact with the elongated members.

This implementation is very advantageous, as it permits manufacture of standard see-saw-motion loading devices which can be installed on any type of vehicle carrier inasmuch as no piece is disposed below the lower plane of the auxiliary chassis, and that its size can be adapted to the size of the frame of the receiving vehicle. The manufacturer of the see-saw motion loading device can therefore tailor his production to actual requirements, and the utilization of the vehicle carrier is further enhanced by the consequently shorter installation periods possible.

According to a particular implementation the elongated members include respective guide devices, and the bases cooperate with the guide devices; there is additionally provided a device for blocking any movement of one of the bases, following installation of the auxiliary chassis on the vehicle carrier.

According to this mode of implementation, it is, on one hand, possible to modify the size of the see-saw motion loading device in order to adapt the same to the frame of the vehicle carrier, and, on the other hand, it is possible to move the anchoring location of the see-saw-motion loading device further forward in order to obtain a better torque, or towards the rear in order to obtain a greater angle of leverage. The blockage of the movement of any of the bases can be implemented by any devices known in the state of the art, in particular by welding, or by belts, or by rivets.

According to a particular embodiment, there is further provided a device for temporarily locking the movable base in place. It will be understood that the locking of the movable base results also in a blockage of the see-saw movement of the loading platform.

According to a preferred embodiment, the device for opening and closing the see-saw-motion rocking member includes a two-part hydraulic traction jack, one part thereof being connected to a fixed base in the rear of the auxiliary chassis, the other part thereof being connected to the movable base.

Utilization of a so-positioned hydraulic traction jack permits minimization of any undesirable encroachment of the loading device into spaces normally reserved for other purposes.

According to a preferred embodiment, the first branch is disposed downstream of the second branch.

According to an advantageous embodiment, the hydraulic jack is elongated, and there is further provided a motion-locking device substantially parallel with the direction of elongation of the hydraulic jack, the motion-locking device including a first tube pivotable about the second lower axle, and a second tube, the first tube being slidable within the second tube, another axle cooperating with the stationary base, the second tube being pivotable about at least one of the last-named axles, and there is additionally provided a locking device operable for blocking a relative movement between the first and second tubes. In a preferred embodiment the locking device includes a shaft radially movable between an engagement and a disengagement position, and being secured to the second tube, the first tube having a plurality of radially extending blocking orifices, the shaft cooperating with the radially extending blocking orifices when it is in the engagement position.

The above-described locking device permits blockage of the loading platform in either an elevated or depressed position with great reliability.

In a preferred embodiment the auxiliary chassis is operable in cooperation with the loading platform, and further including a driven axle of rotation in driving relationship with the loading platform for pivoting the loading platform, the axle of rotation being disposed in a plane below a plane of the vehicle carrier, and transverse to the loading direction.

The effect of the lever of the hydraulic jack is thus improved, and the power transmitted to the loading platform is increased.

BRIEF DESCRIPTION OF THE DRAWING

Other implementation examples will be better understood from the following description based on the sole FIGURE of the drawing, which is a perspective view of the see-saw movement rocker, according to the present invention.

DESCRIPTION OF THE PREFERRED EMBODIMENT

The see-saw motion loading device, as shown in the sole figure, is secured to the frame of a non-illustrated vehicle carrier by means of an auxiliary chassis 1 made up of two elongated members including guide means, such as rails 2 and 3, which in turn form respective outer borders of a stationary base 4 and a movable base 5. The bases 4 and 5 cooperate with the guide rails 2 and 3, and are disposed between, transversely to, and in respective slidable contact with the elongated rails 2 and 3. Each of the bases 4 and 5 is, in turn, made up of two telescopic members 6, 7, and 8, 9, respectively, which are telescopically slidable with respect to one another. A structure of this type permits, for example, the lowering of the height of the auxiliary chassis 1 by welding a tubular element 10 onto the elongated member 3. Prior to such final securement, it is possible to adjust the longitudinal position of the stationary base 4.

The stationary base 4 has two ears or lugs 13 and 14 for holding therein respective ends of transverse axles 15 and 16. The transverse axles 15 and 16 constitute two pivot axes of respective rocking members 18 and 17. The rocking members 17 and 18 are, in turn, constituted by first and second respective doubly pivotable members 19 and 20, which are pivotable with lower or first respective ends thereof, about respective lower pivot axes corresponding to axles 16 and 15, and with upper or second respective ends thereof, about respective upper pivot axes corresponding to upper axles 21 and 22. The rocking members 17 and 18 define a second pair of doubly pivotable members 23 and 24, respectively, which, in turn, are pivotable with respective lower or second ends thereof, about lower axes corresponding to lower axles 25 and 26, while also cooperating with the movable base 5, whereas respective upper or first ends thereof are pivotable about respective upper axles 27 and 28. The upper axles 21 and 27 of the first rocking member 17, and the upper axles 22 and 28 of the second rocking member 18, are, in turn, pivotably connected to, and held at respective fixed distances from one another by respective sliding blocks 29 and 30. The sliding blocks 29 and 30, are, in turn, movable in a longitudinal direction substantially parallel to a direction of loading or to the directions of extension of the rails 3 and 4 with respect to a non-illustrated loading platform.

Functionally, the doubly pivotable members 19 and 20 constitute a first branch, and the doubly pivotable members 23 and 24 constitute a second branch of the rocking member ensemble (17, 18,), while the sliding blocks 29 and 30 can be denoted as sliding block means (29,30) of the rocking member ensemble (17,18).

The see-saw motion loading device is additionally provided with a two-part elongated hydraulic traction jack, a body 31 of which is secured to the stationary base 4, and a piston 32 of which is acting on the movable base 5. A motion-locking device 33 is disposed substantially in parallel with the direction of elongation of the hydraulic jack, and is constituted by an interior tube 34, which is connected to the mobile base 5 by means of the axle 25, and by an exterior tube 35, which is connected to the fixed base 4. A locking means 36 is constituted by a shaft, which cooperates, in an extended position, with radial orifices provided in the interior tube 34. The shaft is displaced by a command issued to a lever which may also be a manually operated- or hand-lever - through a cable 37.

It will be fully understood that the present invention is in no way limited to the implementation shown only by way of an example. In particular the upper axles 22 and 28 connected to the doubly pivotable members 20 and 24, respectively, of the second rocking member 18 may alternatively be connected to the doubly pivotable members 19 and 23, respectively, of the first rocking member 17, instead of to the sliding block 30, and by implication also to the sliding block 29 of the first rocking member 17. Furthermore sliding means other than guide rails can be envisaged.

Furthermore, the invention is not restricted to the see-saw motion of a loading platform, but applies equally to see-saw movements of any means disposed on a vehicle carrier, such as a cradle, a towing device, a special loading platform and the like.

I claim:

1. A loading device for a vehicle carrier, comprising:
   a chassis;
   a first pair of support arms respectively having one end thereof pivotably fixed about a stationary axis defined upon said chassis;
   a base member movably disposed upon said chassis along a longitudinal direction of movement;
   a second pair of support arms respectively having one end thereof pivotably fixed about a movable axis defined upon said base member;
   a pair of laterally spaced block members having respective second ends of said first pair of support arms and said second pair of support arms pivotably fixed upon said pair of laterally spaced block members at longitudinally spaced locations such that said first and second pairs of support arms, said block members, and a portion of said chassis defined between said stationary axis and said movable axis define a trapezoidal support structure when said first and second pairs of support arms are disposed in a non-collapsed state; and
   drive means interposed between said chassis and said movable base for moving said movable base in said longitudinal direction so as to in turn cause pivotal movement of said first and second pairs of support arms about said stationary and movable axes, as well as said spaced locations upon said block members, whereby said block members can be longitudinally and elevationally moved so as to support a load upon said vehicle carrier.

2. A loading device according to claim 1, further comprising two elongated members (2, 3), at least one stationary base (4), said bases (4, 5) being movable telescopically with respect to one another along a direction substantially parallel with said longitudinal direction, and being disposed between, transversely to, and in respective contact with said elongated members (2) and (3).

3. A loading device according to claim 2, wherein said elongated members (2, 3) include respective guide means, and wherein said bases (4, 5) cooperate with said guide means, and further comprising means for blocking any movement of one of said bases (4, 5), following installation of the chassis (1) on said vehicle carrier.

4. A loading device according to claim 3, further comprising means connected to said bases for temporarily locking said movable base (5) in place.

5. A loading device according to claim 1, wherein said drive means comprises a two-part hydraulic traction jack, one part thereof being connected to a fixed base (4), the other part thereof being connected to said movable base (5).

6. A loading device according to claim 5, wherein said hydraulic jack is elongated, and further comprising a motion-locking device (33) substantially parallel with the direction of elongation of said hydraulic jack, said motion-locking device (33) including a first tube (34) pivotable about said movable axis (25), and a second tube (35), said first tube (34) being slidable within said second tube (35), another axis cooperating with said stationary base (4), said second tube being pivotable about at least one of said last-named axes, and further comprising locking means (36) operable for blocking a relative movement between said first and second tubes (34, 35).

7. A loading device according to claim 6, wherein said locking means (36) comprises a shaft radially movable between an engagement and a disengagement position, and being secured to said second tube (35), said first tube having a plurality of radially extending blocking orifices, said shaft cooperating with said radially extending blocking orifices when it is in said engagement position.

* * * * *